(12) United States Patent
Chen et al.

(10) Patent No.: US 11,002,860 B2
(45) Date of Patent: May 11, 2021

(54) GNSS-RTK-BASED POSITIONING METHOD

(71) Applicant: ZHEJIANG YAT ELECTRICAL APPLIANCE CO., LTD, Zhejiang (CN)

(72) Inventors: Yong Chen, Zhejiang (CN); Jianfei Gong, Zhejiang (CN); Fengwu Chen, Zhejiang (CN); Zhe Zhang, Zhejiang (CN)

(73) Assignee: ZHEJIANG YAT ELECTRICAL APPLIANCE CO., LTD, Zhejiang (CN)

( * ) Notice: Subject to any disclaimer, the term of this patent is extended or adjusted under 35 U.S.C. 154(b) by 0 days.

(21) Appl. No.: 16/965,019

(22) PCT Filed: May 30, 2019

(86) PCT No.: PCT/CN2019/089207
§ 371 (c)(1),
(2) Date: Jul. 27, 2020

(87) PCT Pub. No.: WO2019/228439
PCT Pub. Date: Dec. 5, 2019

(65) Prior Publication Data
US 2021/0072406 A1    Mar. 11, 2021

(30) Foreign Application Priority Data

Jun. 1, 2018 (CN) .......................... 201810556616.5

(51) Int. Cl.
*G01S 19/44* (2010.01)
*G01S 19/41* (2010.01)

(52) U.S. Cl.
CPC .............. *G01S 19/44* (2013.01); *G01S 19/41* (2013.01)

(58) Field of Classification Search
CPC .................................. G01S 19/41; G01S 19/44
See application file for complete search history.

(56) References Cited

U.S. PATENT DOCUMENTS

| 2004/0145518 A1 | 7/2004 | Toda et al. |
| 2006/0106533 A1 | 5/2006 | Hirokawa |
| 2019/0196022 A1* | 6/2019 | Rezaei .................... G01S 19/44 |

FOREIGN PATENT DOCUMENTS

| CN | 102096084 A | 6/2011 |
| CN | 106873017 A | 6/2017 |

(Continued)

OTHER PUBLICATIONS

K. Krasuski, Aircraft positioning using SPP method in GPS system, Aircraft Engineering and Aerospace Technology, vol. 90(8), p. 1213-1220 (Year: 2018).*

(Continued)

*Primary Examiner* — Bernarr E Gregory
*Assistant Examiner* — Fred H Mull
(74) *Attorney, Agent, or Firm* — Yue (Robert) Xu; Apex Attorneys at Law, LLP

(57) ABSTRACT

The GNSS-RTK-based positioning method includes the following steps: Step 1, performing data quality control according to analyzed raw satellite-ground observation values; Step 2, performing SPP positioning by using a pseudorange observation value, and performing RTD positioning according to an RTD pseudorange residual of a previous epoch and a pseudorange residual of a current epoch obtained through SPP positioning calculation; Step 3, calculating a float solution by means of the least squares method and Kalman filtering of additional ambiguity parameters in which the RTD positioning result is used as an initial value; and Step 4, converting the float ambiguity solution into a fixed solution by using an optimized partial ambiguity fixing strategy.

8 Claims, 2 Drawing Sheets

(56) References Cited

FOREIGN PATENT DOCUMENTS

| CN | 108051840 | A |   | 5/2018  |
|----|-----------|---|---|---------|
| CN | 108845340 | A |   | 11/2018 |
| CN | 108871179 | B | * | 6/2020  |
| NC | 107607973 | A |   | 1/2018  |

OTHER PUBLICATIONS

English Translation of CN102096084A (Year: 2021).*
English Translation of CN106873017A (Year: 2021).*
English Translation of CN107607973A (Year: 2021).*
English Translation of CN108051840A (Year: 2021).*
English Translation of CN108871179B (Year: 2021).*
International Search Report for PCT/CN2019/089207 dated Jul. 26, 2019, ISA/CN.

* cited by examiner

GNSS-RTK-BASED POSITIONING METHOD

The present application is a National phase application of PCT international patent application PCT/CN2019/089207, filed on May 30, 2019 which claims the priority to Chinese Patent Application No. 201810556616.5, titled "GNSS-RTK-BASED POSITIONING METHOD", filed on Jun. 1, 2018 with the Chinese Patent Office, both of which are incorporated herein by reference in their entireties.

TECHNICAL FIELD

The present disclosure relates to the field of satellite navigation positioning, and in particular to a GNSS-RTK-based positioning method.

BACKGROUND

GNSS (Global Satellite Navigation System), also referred to as Global Navigation Satellite System, is a space-based radio navigation positioning system which can provide users with three-dimensional coordinates, speed, and time information in all weather conditions at any place on the surface of the earth or in near earth space. In RTK (Real-time Kinematic) carrier phase differential technology, a method for processing difference of carrier phase observations of two measuring stations in real time is used. In the method, a carrier phase collected by a reference station is sent to a user receiver to calculate difference and calculate coordinates. With an increasing requirement for position information by users, the conventional high-cost and high-precision positioning mode can no longer meet actual requirements. Especially when positioning is performed in complex environments such as places shaded by buildings and trees, the conventional high-cost and high-precision positioning mode has problems of poor accuracy and reliability.

SUMMARY

To solve the above problems, a GNSS-RTK-based positioning method having high positioning accuracy is provided according to the present disclosure.

A GNSS-RTK-based positioning method includes:

step 1, performing data quality control based on an analyzed raw satellite-ground observation value;

step 2, performing SPP positioning by using a pseudorange observation value, and performing RTD positioning based on a RTD pseudorange remaining error of a previous epoch and a pseudorange remaining error of a current epoch calculated by using the SPP positioning;

step 3, calculating, by using a RTD positioning result as an initial value, a float solution by respectively performing a least square algorithm and a Kalman filtering having an additional parameter of an ambiguity; and step 4, converting the floating solution of the ambiguity into a fixed solution by using an optimized partial ambiguity fixation strategy.

In an embodiment, the performing data quality control based on an analyzed raw satellite-ground observation value in step 1 includes:

obtaining a reliable observation value by performing observation data preprocessing;

detecting and correcting a gross error by using a data detection method; and detecting and eliminating a cycle slip by using a cycle slip detection method based on a secondary difference between epochs and a single station cycle slip detection method based on a difference between epochs.

In an embodiment, the obtaining a reliable observation value by performing observation data preprocessing includes:

selecting an observation value having a signal-to-noise ratio within a predetermined range;

determining data availability based on a pseudorange, carrier accuracy information, and an available identifier; and selecting observation data based on satellite continuous tracking and solution availability.

In an embodiment, the detecting and correcting a gross error by using a data detection method includes:

constructing a linearized pseudorange observation equation:

$$V = L - A \cdot X$$

where V represents a remaining error vector, L represents an observation value minus a calculated value, A represents a design matrix, and X represents a parameter vector;

constructing a normalized remaining error $\hat{V}_i$ as a gross error detection:

$$\bar{V}_i = \frac{V_i}{\delta \sqrt{Q_{V_i V_i}}}, \quad \bar{V}_i \sim N(0,1)$$

$$Q_{VV} = P^{-1} - A(A^T P A)^{-1} A^T$$

where $V_i$ represents an element of the remaining error vector, P represents a weight matrix of the observation value, $\delta$ represents a unit weight error, and $Q_{V_i V_i}$ represents a diagonal element in a remaining error co-factor matrix $Q_{VV}$;

if the normalized remaining error satisfies: $|\bar{V}_i| > 1.96$, determining that there is a gross error, and if the normalized remaining error satisfies: $|\bar{V}_i| \leq 1.96$, processing the weight matrix as follows:

$$\begin{cases} P = 2P, & 0 \leq || < 0.5 \\ P = P, & 0.5 \leq || < 1.0 \\ P = 0.5\ P, & 1.0 \leq || < 1.5 \\ P = 0.25\ P, & 1.5 \leq || \leq 1.96 \end{cases} ;$$

dividing the observation value minus a calculated value L into $l_1$ and $l_2$, where $l_1$ contains no gross error, $l_2$ contains a gross error vector S, and dimensions of $l_1$ and $l_2$ are $n_1$ and $n_2$ respectively;

transforming the pseudorange observation equation into:

$$\begin{bmatrix} V_1 \\ V_2 \end{bmatrix} = \begin{bmatrix} l_1 \\ l_2 \end{bmatrix} - \begin{bmatrix} A_1 \\ A_2 \end{bmatrix} \cdot X - \begin{bmatrix} 0 \\ S \end{bmatrix};$$

supposing $H = [0\ E]^T$, where E is an $n_2 \times n_2$ identity matrix, and calculating and correcting the gross error vector S as follows:

$$S = P_{SS}^{-1} H^T P V$$

$$P_{SS} = H^T P Q_{VV} P H$$

In an embodiment, the detecting and eliminating a cycle slip by using a cycle slip detection method based on a secondary difference between epochs and a single station cycle slip detection method based on a difference between epochs includes:

detecting a large cycle slip equal to or greater than two cycles based on the second difference between epochs, and detecting and eliminating a small cycle slip by using the single station cycle slip detection method based on a single difference observation value between epochs, where the detecting a large cycle slip equal to or greater than two cycles based on the second difference between epochs includes:

calculating, based on a carrier observation value $\varphi_t$ of the satellite at the current epoch and a carrier observation value $\varphi_{t-1}$ of the previous epoch, a carrier observation value single difference between epochs for the current epoch:

$$\nabla \varphi_t = \varphi_t - \varphi_{t-1} \quad (9)$$

calculating a carrier observation value single difference between epochs for the previous epoch:

$$\nabla \varphi_{t-1} = \varphi_{t-1} - \varphi_{t-2} \quad (10)$$

calculating a carrier observation value secondary difference between epochs for the current epoch:

$$\nabla \Delta \varphi = \nabla \varphi_t - \nabla \varphi_{t-1} \quad (11)$$

calculating carrier observation value secondary differences between epochs for all observation satellites $F=[\nabla \Delta \varphi^1, \nabla \Delta \varphi^2, \ldots, \nabla \Delta \varphi^n]$ if the carrier is continuously tracked, where elements in the vector F are concentratedly distributed, and if an element goes beyond a value center by 2 cycles, a large cycle slip is determined.

In an embodiment, the RTD positioning in step 2 includes:

calculating an observation value variance $\sigma_i^2$ of the current epoch based on a RTD pseudorange remaining error of the previous epoch and the pseudorange remaining error calculated by using the SPP positioning at the current epoch, where the observation value variance $\sigma_i^2$ of the current epoch is calculated by using following models:

$$\begin{cases} \sigma_i^2 = 0.3\ V_0^2 + 0.7(V_b^2 + V_r^2), & V_0^2 > 4(V_b^2 + V_r^2) \\ \sigma_i^2 = 0.5\ V_0^2 + 0.5(V_b^2 + V_r^2), & (V_b^2 + V_r^2) < V_0^2 < 4(V_b^2 + V_r^2) \\ \sigma_i^2 = 0.7\ V_0^2 + 0.3(V_b^2 + V_r^2), & V_0^2 \leq (V_b^2 + V_r^2) \end{cases}$$

where $V_b$ represents a pseudorange remaining error by SPP positioning at a reference station, $V_r$ represents a pseudorange remaining error by SPP positioning at a rover station, and $V_0$ represents a pseudorange remaining error of the previous epoch by RTD positioning.

In an embodiment, the calculating, by using a RTD positioning result as an initial value, a float solution of ambiguity by respectively performing a least square algorithm and a Kalman filtering having an additional parameter of an ambiguity in step 3 includes:

constructing double difference observation equations:

$$\begin{cases} \Delta \nabla P_i = \Delta \nabla \rho + \Delta \nabla T + \Delta \nabla I + \varepsilon_{\Delta \nabla P} \\ \Delta \nabla \phi_i = \Delta \nabla \rho + \Delta \nabla T - \Delta \nabla I + \lambda_i \Delta \nabla N_i + \varepsilon_{\Delta \nabla \phi} \end{cases}$$

where $\Delta \nabla$ represents a double difference operator, $P_i$ represents a pseudorange observation value, $\rho$ represents a satellite-ground distance, I represents an ionospheric delay, $\sigma_{\Delta \nabla P}$ represents double difference pseudorange observation noise, $\phi_i$ represents a carrier observation value, $\lambda_i$ represents a carrier wavelength, and $\Delta \nabla N_i$ represents a double difference ambiguity;

converting, based on the double difference observation equations by using position, velocity, and acceleration of the rover station, and single difference ambiguity between stations as to-be-estimated parameters, the single difference ambiguity between stations into the double difference ambiguity $\Delta \nabla N_i$ by using a transformation matrix, where a parameter matrix of the Kalman filtering and the transformation matrix are as follows:

$$X_k = [x\ y\ z\ v_x\ v_y\ v_z\ a_x\ a_y\ a_z\ \Delta N^1\ \ldots\ \Delta N^n]^T$$

$$H_k = \begin{bmatrix} l^1 & m^1 & n^1 & 0 & \lambda_1^1 & \ldots & -\lambda_1^j & \ldots & \ldots \\ \vdots & \vdots & \vdots & 0 & \vdots & & \vdots & & \vdots \\ l^n & m^m & n^n & 0 & \ldots & \ldots & -\lambda_1^j & \ldots & \lambda_1^n \\ l^n & m^n & n^n & 0 & \ldots & \ldots & 0 & \ldots & 0 \\ \vdots & \vdots & \vdots & \vdots & \vdots & \vdots & \vdots & & \vdots \\ l^n & m^n & n^n & 0 & \ldots & \ldots & 0 & \ldots & 0 \end{bmatrix}^T$$

where (x, y, z) represents a position of the satellite at a reference time instant, $(v_x, v_y, v_z)$ represents a velocity of the satellite at the reference time instant, $(a_x, a_y, a_z)$ represents an acceleration of the satellite at the reference time instant;

calculating a floating solution $\hat{N}$ of the ambiguity and a posterior remaining error $\sigma$ by performing a least square algorithm, and transforming, based on the floating solution $\hat{N}$ of the ambiguity and the posterior remaining error $\sigma$, the floating solution $\overline{N}$ of the ambiguity calculated by the Kalman filtering as follows:

$$\begin{cases} \overline{N} = \overline{N}, & 0 \leq |\overline{N} - \hat{N}| < 1.5\sigma \\ \overline{N} = 0.35\ \overline{N} + 0.65\ \hat{N}, & 1.5\sigma \leq |\overline{N} - \hat{N}| < 3.0\sigma \\ \overline{N} = \hat{N}, & |\overline{N} - \hat{N}| \geq 3.0\sigma \end{cases}$$

In an embodiment, the converting the floating solution of the ambiguity into a fixed solution by using an optimized partial ambiguity fixation strategy in step 4 includes:

sorting the ambiguity based on a floating solution variance, and gradually searching for the ambiguity fixedly according to an accuracy order of the floating solution;

reducing correlation between the parameter of double difference ambiguity and a corresponding variance-covariance matrix to obtain a transformed ambiguity having lower correlation, where the equation for reducing correlation is as follows:

$$\begin{cases} \hat{z} = Z^T \overline{N} \\ Q_{\hat{z}} = Z^T Q_{\hat{N}} Z \end{cases}$$

where $Z^T$ represents a transformation matrix, $\overline{N}$ represents a floating solution of the ambiguity, $\hat{z}$ represents a transformed ambiguity, $Q_{\hat{a}}$ represents a variance-covariance matrix of the floating solution of the ambiguity, $Q_{\hat{z}}$ represents a variance-covariance matrix of a floating solution of the transformed ambiguity, elements in the matrix are all integers, values of determinants are equal to ±1, and a transformed search space is:

$$\psi_{\bar{N}} = \{\bar{N} \in Z^n | \|\bar{N}-N\|_{Q_{\bar{N}}}^2 \leq \chi^2\}$$

where $\chi^2$ represents a searching space;

obtaining a integer solution of an original ambiguity by performing an inverse transformation on a searched integer solution $\check{z}$:

$$\check{N} = Z^{-T}\check{z};$$

defining a Ratio value to test the fixed solution of the ambiguity:

$$\text{Ratio} = \frac{\|\bar{N} - \bar{N}_S\|_{Q_{\hat{N}}}^2}{\|\bar{N} - \bar{N}_F\|_{Q_{\hat{a}}}^2} > 3.0$$

where $\bar{N}_S$ represents a suboptimal solution, and $\bar{N}_F$ represents an optimal solution;

determining that the solution is qualified if the above equation is satisfied, and retaining the floating solution if the above equation is not satisfied;

retaining the fixed solution of the ambiguity and configuring a fixed solution accuracy if multiple consecutive ambiguities are all fixed and satisfy a fixed condition in which a first ambiguity is fixed; and testing a part of ambiguities, and configuring the part of ambiguities as fixed solutions if the fixed condition is satisfied.

With the present disclosure, following effects can be achieved:

(1) data quality control and remaining error processing is performed, so that the raw data can be effectively improved, the data quality can be fully evaluated, and reliable raw observation data and reference basis can be provided for the floating solution and the fixed solution of the ambiguity, thereby improving positioning accuracy;

(2) the floating solution of the ambiguity is calculated by using the least square algorithm and the Kalman filtering having an additional parameter of an ambiguity, so that convergence speed is effectively improved and filtering anomalies are prevented, thereby improving accuracy of the floating solution, and thus shortening the time for fixing the ambiguity; and (3) the solution information is fully utilized to achieve fast fixing of the ambiguity.

BRIEF DESCRIPTION OF THE DRAWINGS

The present disclosure is described in further detail hereinafter with reference to the drawings and specific embodiments.

DETAILED DESCRIPTION OF THE EMBODIMENTS

The technical solutions according to the present disclosure are further described hereinafter with reference to the drawings in embodiments of the present disclosure. However, the present disclosure is not limited to these embodiments.

A GNSS-RTK-based positioning method is provided. The main concept of the method includes:

(1) data preprocessing and quality control, including: selecting a reliable satellite observation value, finding and repairing a pseudorange gross error, detecting and eliminating a carrier cycle slip, and providing a reliable pseudorange and carrier observation value, so as to ensure continuity of an ambiguity and reduce or prevent lost-lock of a fixed solution;

(2) updating a random model in real time, including: determining a RTD (real-time pseudorange relative positioning) random model based on a SPP (pseudorange single-point positioning) remaining error and a posterior remaining error of a previous epoch, and determining a floating solution double difference pseudorandom random model based on a RTD remaining error, so as to ensure the accuracy of the random models and improve the accuracy of positioning results;

(3) determining a floating solution by using a least square principle and a Kalman filtering, including: using a floating solution of the ambiguity calculated by using the least square algorithm to improve a solution obtained by using the Kalman filtering, so as to effectively improve the accuracy of the floating solution and the filtering convergence efficiency, thereby preparing for further fixing the ambiguity; and (4) fixing an ambiguity, including: sorting a floating solution of the ambiguity based on a variance-covariance, adopting a gradual fixing strategy, a partial ambiguity fixation strategy, and a retention strategy to effectively improve the efficiency of fixing ambiguity, and performing post-filtering to improve the accuracy of the floating solution, so as to quickly and reliably implement high-precision positioning, and thus satisfy location requirements.

Figure 1:
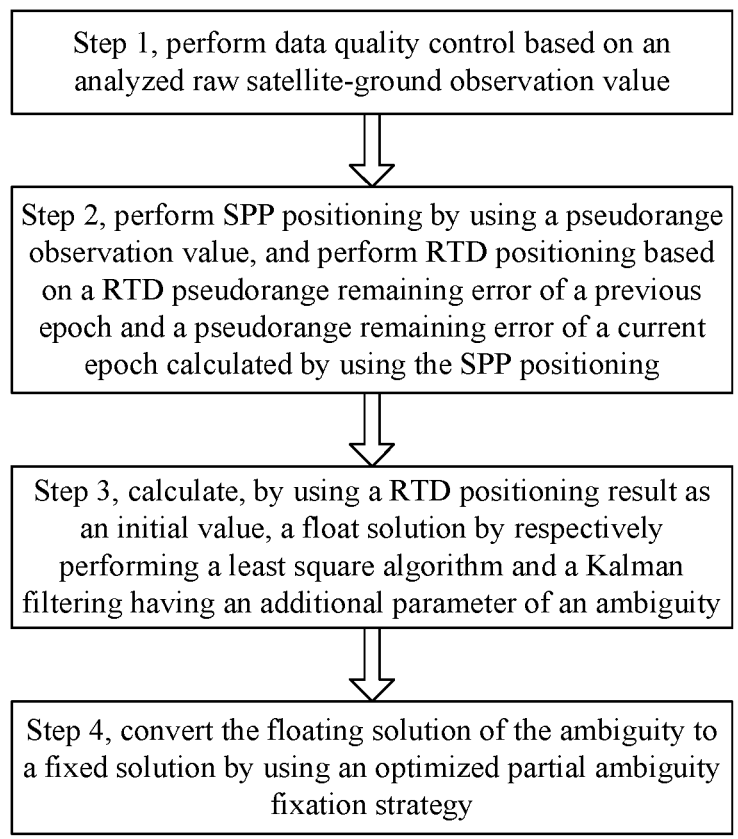
FIG. 1 is a schematic diagram of an overall process of the present disclosure.

With reference to FIG. 1, following steps 1 to 4 are included in the method according to an embodiment.

In step 1, data quality control is performed based on an analyzed raw satellite-ground observation value.

In step 2, SPP positioning is performed by using a pseudorange observation value, and RTD positioning is performed based on a RTD pseudorange remaining error of a previous epoch and a pseudorange remaining error of a current epoch calculated by using the SPP positioning.

In step 3, by using a RTD positioning result as an initial value, a float solution is calculated by respectively performing a least square algorithm and a Kalman filtering having an additional parameter of an ambiguity.

In step 4, the floating solution of the ambiguity is converted into a fixed solution by using an optimized partial ambiguity fixation strategy.

Figure 2:
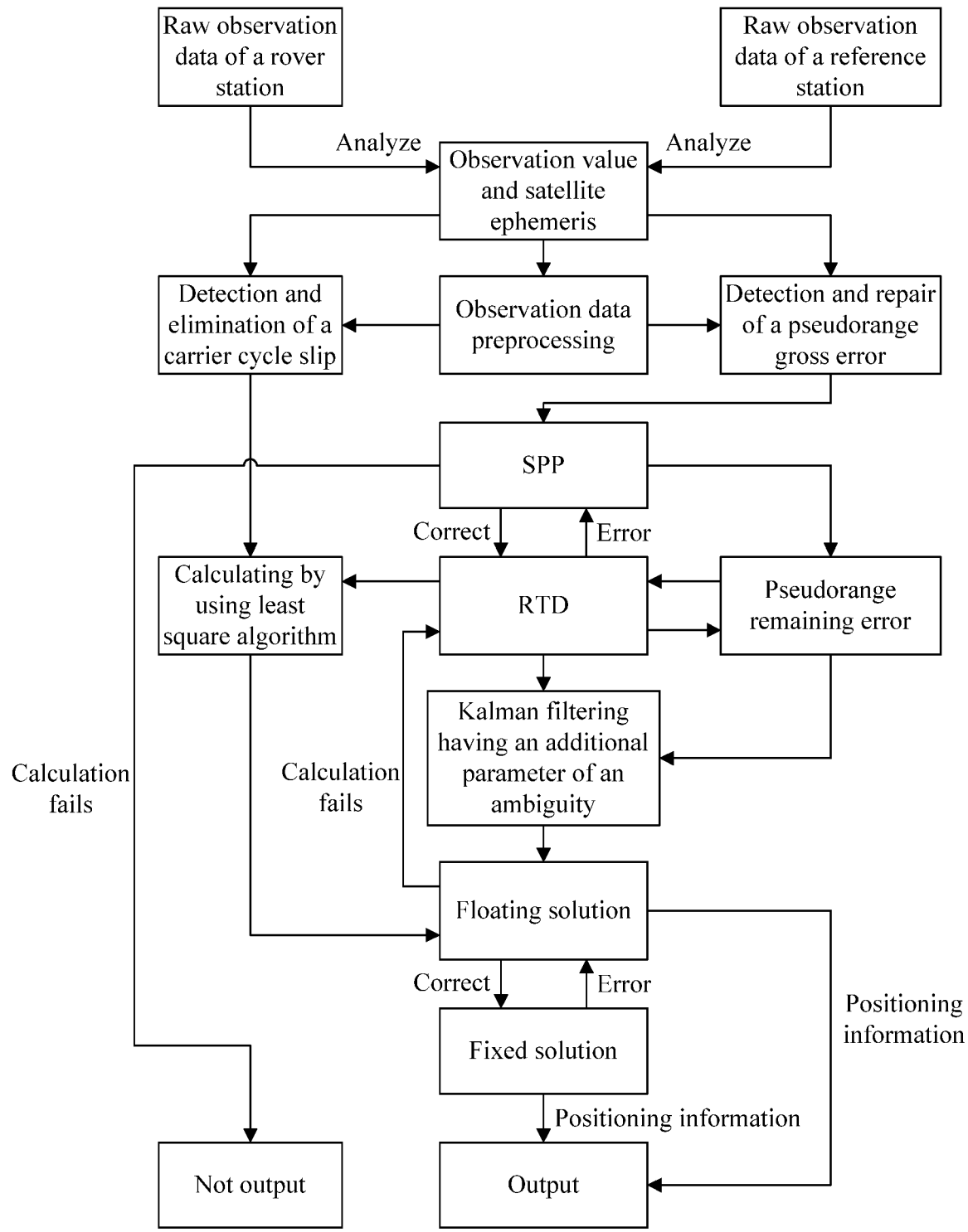
FIG. 2 is a schematic diagram of a detailed process of the present disclosure.

With reference to FIG. 2, each of the above steps is described in detail below.

In step 1, data quality control is performed based on an analyzed raw satellite-ground observation value.

Raw observation data of a reference station and a rover station is generally compiled using a custom protocol or a standard protocol. An observation value and a satellite ephemeris are obtained by analyzing the raw observation data of the reference station and the raw observation data of the rover station. However, the observation value and the satellite ephemeris have large errors, and some observations and satellite ephemeris have cycle slips.

Differential data of the reference station is generally compiled using a RTCM standard protocol. Frame structure of the RTCM standard protocol includes a synchronization code, a reserved bit, an information length, data information, and a CRC. For RTD, definition information is required to be broadcasted, which includes position information of the reference station and observation values of each GNSS system. For the raw observation data of the rover station, a custom binary protocol is generally adopted, and satellite observation data and a data accuracy indicator are required to be included.

Satellite orbit information is calculated based on an almanac and local observation time. For a CDMA (code division multiple access) satellite positioning system, broadcasted ephemeris forecast parameters include: a time parameter, six parameters for Kepler, and nine parameters for orbit perturbation.

The time parameter includes $t_{oe}$, $t_{oc}$, and IODE, where $t_{oe}$ represents a ephemeris reference time instant (seconds), $t_{oc}$ represents a clock difference reference time instant (seconds), and IODE represents an ephemeris data age.

The six parameters for Kepler include $M_0$, e, $\sqrt{a}$, $\Omega_0$, $i_0$, and $\omega$, where $M_0$ represents a flat near point angle (radian) at a time instant $t_{oe}$, e represents an orbit eccentricity, $\sqrt{a}$ represents a square root ($\sqrt{m}$) of a semi major axis, $\Omega_0$ represents a right ascension (radian) of ascending node calculated based on reference time, $i_0$ represents an orbital inclination (radian) calculated based on the reference time, and $\omega$ represents a perigee angular distance (radian).

The nine parameters for orbit perturbation include $\Delta n$, $\dot{\Omega}$, IDOT, $C_{uc}$, $C_{us}$, $C_{rc}$, $C_{rs}$, $C_{ic}$, and $C_{is}$, where $\Delta_n$ represents a difference (radian) between an average motion rate of the satellite and a calculated value, $\dot{\Omega}$ represents a changing rate (radians/second) of the right ascension of ascending node, IDOT represents a changing rate (radians/second) of the orbital inclination, $C_{uc}$ represents an amplitude (radian) of a cosine harmonic correction term of a latitude angle, $C_{us}$ represents an amplitude (radian) of a sine harmonic correction term of the latitude angle, $C_{rc}$ represents an amplitude (radian) of a cosine harmonic correction term of an orbit radius, $C_{rs}$ represents an amplitude (radian) of a sine harmonic correction term of the orbit radius, $C_{ic}$ represents an amplitude (radian) of a cosine harmonic correction term of an orbit inclination, and $C_{is}$ represents an amplitude (radian) of a sine harmonic correction term of the orbit inclination.

For a FDMA (frequency division multiple access) satellite positioning system, broadcasted ephemeris forecast parameters include: a time parameter and a location parameter.

The time parameter includes $t_{oe}$ and IODE, where $t_{oe}$ represents a ephemeris reference time instant (seconds), and IODE represents an ephemeris data age.

The location parameter includes (x, y, z), ($v_x$, $v_y$, $v_z$), and ($a_x$, $a_y$, $a_z$), where (x, y, z) represents a position of the satellite at a reference time instant, ($v_x$, $v_y$, $v_z$) represents a velocity of the satellite at the reference time instant, and ($a_x$, $a_y$, $a_z$) represents an acceleration of the satellite at the reference time instant.

Specifically, the process of performing data quality control based on an analyzed raw satellite-ground observation value in step 1 includes following steps 1.1 to 1.3.

In step 1.1, observation data preprocessing is performed to obtain a reliable observation value.

Firstly, an observation value having a signal-to-noise ratio within a reasonable range is selected based on the signal-to-noise ratio of the observation data. Then, unavailable data is eliminated based on a data available identifier. Then, data having higher precision is selected based on a pseudorange and carrier accuracy information outputted from the data. Finally, it is determined whether the observation value is to be used in calculation based on satellite tracking continuity.

In step 1.2, detection and repair of a pseudorange gross error is performed, that is, a gross error is detected and corrected by using a data detection method.

A linearized pseudorange observation equation is constructed as follows:

$$V = L - A \cdot X \tag{1}$$

where V represents a remaining error vector (meters), L represents an observation value minus a calculated value (meters), A represents a design matrix, and X represents a parameter vector.

A normalized remaining error $\overline{V}_i$ is constructed as a gross error detection as follows:

$$\overline{V}_i = \frac{V_i}{\delta \sqrt{Q_{V_i V_i}}} \tag{2}$$

$$\overline{V}_i \sim N(0,1) \tag{3}$$

$$Q_{VV} = P^{-1} - A(A^T P A)^{-1} A^T \tag{4}$$

where $V_i$ represents an element of the remaining error vector, P represents a weight matrix of the observation value, $\delta$ represents a unit weight error, and $Q_{V_i V_i}$ represents a diagonal element in a remaining error co-factor matrix $Q_{VV}$.

If the normalized remaining error satisfies: $|\overline{V}_i| > 1.96$, it is determined that there is a gross error; and if the normalized remaining error satisfies: $|\overline{V}_i| \leq 1.96$, the weight matrix is processed as follows:

$$\begin{cases} P = 2P, & 0 \leq \| \| < 0.5 \\ P = P, & 0.5 \leq \| \| < 1.0 \\ P = 0.5\ P, & 1.0 \leq \| \| < 1.5 \\ P = 0.25\ P, & 1.5 \leq \| \| \leq 1.96 \end{cases} \tag{5}$$

The L in equation (1) is divided into $l_1$ and $l_2$, where $l_1$ contains no gross error, $l_2$ contains a gross error vector S, and dimensions of $l_1$ and $l_2$ are $n_1$ and $n_2$ respectively.

Equation (1) is transformed into:

$$\begin{bmatrix} V_1 \\ V_2 \end{bmatrix} = \begin{bmatrix} l_1 \\ l_2 \end{bmatrix} - \begin{bmatrix} A_1 \\ A_2 \end{bmatrix} \cdot X - \begin{bmatrix} 0 \\ S \end{bmatrix}; \tag{6}$$

Supposing $H = [0\ E]^T$, where E is an $n_2 \times n_2$ identity matrix, the gross error vector S is calculated and corrected as follows:

$$S = P_{SS}^{-1} H^T P V \tag{7}$$

$$P_{SS} = H^T P Q_{VV} P H \tag{8}.$$

In step 1.3, detection and elimination of a carrier cycle slip is performed, that is, a large cycle slip equal to or greater than two cycles is detected based on the second difference between epochs, and then a small cycle slip is detected and eliminated by using a single station cycle slip detection method based on a single difference observation value between epochs.

Specifically, the process of detecting a large cycle slip equal to or greater than two cycles based on the second difference between epochs includes:

calculating, based on a carrier observation value $\varphi_t$ of the satellite at the current epoch and a carrier observation value of the previous epoch, a carrier observation value single difference between epochs for the current epoch:

$$\nabla \varphi_t = \varphi_t - \varphi_{t-1} \qquad (9)$$

calculating a carrier observation value single difference between epochs for the previous epoch:

$$\nabla \varphi_{t-1} = \varphi_{t-1} - \varphi_{t-2} \qquad (10)$$

calculating a carrier observation value secondary difference between epochs for the current epoch:

$$\nabla \Delta \varphi = \nabla \varphi_t - \nabla \varphi_{t-1} \qquad (11)$$

calculating carrier observation value secondary differences between epochs for all observation satellites $F=[\nabla \Delta \varphi^1, \nabla \Delta \varphi^2, \ldots, \nabla \Delta \varphi^n]$ if the carrier is continuously tracked, where elements in the vector F are concentratedly distributed, and if an element goes beyond a value center by 2 cycles, a large cycle slip is determined, and the value center is obtained by averaging the concentratedly distributed elements.

If a vector moves at a low speed (a moving state is not fixed), the carrier observation value secondary difference depends on the moving state, and the value of the carrier observation value secondary difference is inconsistent with a feature value calculated by using a high-order difference method, not obeying Gaussian white noise distribution. However, secondary differences calculated for each epoch are concentratedly distributed around a certain center point, since the observation values of all satellites are related to the current moving state. It can be determined whether a cycle slip occurs on the carrier based on the characteristic of the distribution. A specific calculation method includes: sorting the carrier observation value secondary differences in an ascending order firstly; selecting a median of the group of values as a value center; calculating distances from all the values to the value center, and determining that a large cycle slip occurs on a carrier if a distance from an observation value of the carrier to the value center is greater than two cycles.

Specifically, the small cycle slip is detected and eliminated by using the single station cycle slip detection method based on the single difference observation value between epochs.

A single difference observation equation between epochs is constructed:

$$\lambda \nabla \varphi = \rho S_q - \rho S_p - c\Delta t - \lambda \Delta N + \Delta \varepsilon \qquad (9)$$

where $\nabla \varphi$ represents a single difference observation value (cycles) between epochs, $\rho S_p$ represents a satellite-ground distance (meters) at epoch t, $\rho S_q$ represents a satellite-ground distance (meters) at epoch t+1, $\Delta t$ represents a receiver clock change (seconds), c represents a speed of light (m/s), $\lambda$ represents a carrier wavelength (meters), $\Delta N$ represents a carrier cycle slip (cycles), and $\Delta \varepsilon$ represents observation noise (meters).

To-be-estimated parameters include three coordinate parameters and one receiver parameter. If an error of a posterior unit weight is in millimeters, it is determined that there is no cycle slip. If an error of a posterior unit weight is not in millimeters, iterative calculation is performed step by step using a robust least square algorithm equation until a coordinate difference between two solutions calculated successively meets a tolerance requirement, where an equivalent weight function is selected as follows:

$$\overline{P}_i = \begin{cases} P_i, & |\hat{V}_i| \leq k_0 \\ \dfrac{k_0 P_i}{|\hat{V}_i|}\left(\dfrac{|\hat{V}_i|}{k_1-k_0}\right)^2, & k_0 < |\hat{V}_i| \leq k_1 \\ 0, & |\hat{V}_i| > k_1 \end{cases} \qquad (10)$$

where $\hat{V}_i$ represents a standardized remaining error, P represents a weight matrix model in which a weight is determined by using a height angle.

If the standardized remaining error satisfies:

$$|\hat{V}_i| = \frac{|V_i|}{\sqrt{Q_{vv}}} > 0.01 \text{ m},$$

it is determined that there may be a small cycle slip. Then, a cycle slip estimate of one satellite is added as a to-be-estimated parameter in equation (9) each time, and weights of other abnormal satellites are set as zero to cyclically calculate cycle slip values of each satellite. If a rounded cycle slip value is not equal to zero, it is determined that there is a small cycle slip, and the small cycle slip is eliminated. If a rounded cycle slip value is equal to zero, the abnormal satellite is determined as a normal satellite.

In step 2, the process of performing SPP positioning by using a pseudorange observation value, and performing RTD positioning based on a RTD pseudorange remaining error of a previous epoch and a pseudorange remaining error of a current epoch calculated by using the SPP positioning includes following steps 2.1 to 2.3.

In step 2.1, a pseudodistance double difference observation equation is constructed:

$$\Delta \nabla P_i = \Delta \nabla \rho + \Delta \nabla T + \Delta \nabla I + \varepsilon_{\Delta \nabla P} \qquad (11)$$

where $\Delta \nabla$ represents a double difference operator, $P_i$ represents a pseudorange observation value (meters), $\rho$ represents a satellite-ground distance (meters), I represents an ionospheric delay (meters), $\varepsilon_{\Delta \nabla P}$ represents a double difference pseudorange observation noise (meters).

SPP positioning calculation is performed based on the obtained high-quality observation value to obtain pseudorange remaining errors of the reference station and the rover station calculated by SPP positioning.

In step 2.2, based on a system value and variance of the previous epoch, a state estimate of the current epoch can be derived by using a Kalman filtering model, and the system value and variance of the current epoch are determined by using a measurement equation, where the Kalman filtering model is as follows:

$$\begin{cases} \hat{X}_{k,k-1} = \Phi_{k,k-1}\hat{X}_{k-1} \\ P_{k,k-1} = \Phi_{k,k-1}P_{k-1}\Phi_{k,k-1}^T + \Gamma_{k-1}Q_{k-1}\Gamma_{k-1}^T \\ K_k = P_{k,k-1}H_k^T(H_k P_{k,k-1}H_k^T + R_k)^{-1} \\ \hat{X}_k = \hat{X}_{k,k-1} + K_k(L_k - H_k\hat{X}_{k,k-1}) \\ P_k = (I - K_k H_k)P_{k,k-1} \end{cases} \qquad (12)$$

where I represents an identity matrix, $\overline{X}_{k,k-1}$ represents a one-step predicted value, $P_{k,k-1}$ represents a one-step predicted value variance-covariance matrix, $T_{k-1}$ represents a system noise drive matrix, represents a variance matrix of system noise sequence, $K_k$ represents a gain matrix, $L_k$ represents an observation value sequence, $\hat{X}_{k,k-1}$ represents a to-be-estimated parameter, and $H_k$ represents a coefficient matrix; $R_k$ represents a measurement noise variance matrix, $X_k$ represents a filtering estimate, and $P_k$ represents a filtering variance-covariance matrix.

In step 2.3, an initial position of the rover station is determined based on a derived result by the Kalman filtering model, and the pseudorange double difference OMC (observation value minus measured value) is updated in real time by the Kalman filtering model. Supposing that the pseudorange remaining errors of the reference station and the rover station calculated by SPP positioning are $V_b$ and $V_r$ respectively, and the RTD pseudorange remaining error of the previous epoch is $V_0$, an observation value variance $\sigma_i^2$ of the current epoch is calculated by using following models:

$$\begin{cases} \sigma_i^2 = 0.3V_0^2 + 0.7(V_b^2 + V_r^2), & V_0^2 > 4(V_b^2 + V_r^2) \\ \sigma_i^2 = 0.5V_0^2 + 0.5(V_b^2 + V_r^2), & (V_b^2 + V_r^2) < V_0^2 < 4(V_b^2 + V_r^2) \\ \sigma_i^2 = 0.7V_0^2 + 0.3(V_b^2 + V_r^2), & V_0^2 \leq (V_b^2 + V_r^2) \end{cases} \quad (13)$$

In this step, SPP positioning is performed firstly. If calculation fails, nothing is outputted; and if the calculation is correct, RTD positioning is performed. The observation value variance $\sigma_i^2$ of the current epoch is calculated based on the RTD pseudorange remaining error $V_0$ of the previous epoch and the pseudorange remaining errors $V_b$ and $V_r$ of the current epoch calculated by SPP positioning, thereby facilitating improving the accuracy and stability of the RTD positioning.

In step 3, the process of calculating, by using a RTD positioning result as an initial value, a float solution of ambiguity by respectively performing a least square algorithm and a Kalman filtering having an additional parameter of an ambiguity includes following steps 3.1 to 3.4.

In step 3.1, double difference observation equations are constructed:

$$\begin{cases} \Delta\nabla P_i = \Delta\nabla\rho + \Delta\nabla T + \Delta\nabla I + \varepsilon_{\Delta\nabla P} \\ \Delta\nabla\phi_i = \Delta\nabla\rho + \Delta\nabla T - \Delta\nabla I + \lambda_i\Delta\nabla N_i + \varepsilon_{\Delta\nabla\phi} \end{cases} \quad (14)$$

where $\Delta\nabla$ represents a double difference operator, $P_i$ represents a pseudorange observation value (meters), $\rho$ represents a satellite-ground distance (meters), I represents an ionospheric delay (meters), represents a double difference pseudorange observation noise (meters), $\varepsilon_{\Delta\nabla P}$ represents a carrier observation value (meters), $\lambda_i$ represents a carrier wavelength (meters), and $\Delta\nabla N_i$ represents double difference ambiguity (cycles).

In step 3.2, based on the double difference observation equations, by using position, velocity, and acceleration of the rover station, and single difference ambiguity between stations as to-be-estimated parameters, the single difference ambiguity between stations is converted into the double difference ambiguity $\Delta\nabla N_i$ by using a transformation matrix. A parameter matrix of the Kalman filtering and the transformation matrix are as follows:

$$X_k = [xyzv_xv_yv_za_xa_ya_z\Delta N^1 \ldots \Delta N^n]^T \quad (15)$$

$$H_k = \begin{bmatrix} l^1 & m^1 & n^1 & 0 & \lambda_1^1 & \ldots & -\lambda_1^j & \ldots & \ldots \\ \vdots & \vdots & \vdots & 0 & \vdots & & \vdots & & \vdots \\ l^n & m^n & n^n & 0 & \ldots & \ldots & -\lambda_1^j & \ldots & \lambda_1^n \\ l^n & m^n & n^n & 0 & \ldots & \ldots & 0 & \ldots & 0 \\ \vdots & \vdots & \vdots & \vdots & & & \vdots & & \vdots \\ l^n & m^n & n^n & 0 & \ldots & \ldots & 0 & \ldots & 0 \end{bmatrix}^T \quad (16)$$

In step 3.3, similar to the pseudorange relative positioning, the floating solution Kalman filtering observation equation can also be used to update the double difference observation equation OMC. To improve the numerical stability of the filtering and control the filtering divergence, the matrix $P_k$ is changed into:

$$P_k = (I - K_kH_k)P_{k,k-1}(I - K_kH_k)^T + K_kR_kK_k^T \quad (17)$$

In step 3.4, the floating solution of the ambiguity calculated by using the Kalman filtering may have a large error due to the characteristic of filtering convergence. A floating solution $\hat{N}$ of the ambiguity and a posterior remaining error $\sigma$ are calculated by performing a least square algorithm, and a floating solution $\overline{N}$ of the ambiguity calculated by the Kalman filtering is transformed as follows to improve accuracy:

$$\begin{cases} \overline{N} = \overline{N}, & 0 \leq |\overline{N} - \hat{N}| < 1.5\sigma \\ \overline{N} = 0.35\overline{N} + 0.65\hat{N}, & 1.5\sigma \leq |\overline{N} - \hat{N}| < 3.0\sigma \\ \overline{N} = \hat{N}, & |\overline{N} - \hat{N}| \geq 3.0\sigma \end{cases} \quad (18)$$

In step 4, the process of converting the floating solution of the ambiguity into a fixed solution by using an optimized partial ambiguity fixation strategy includes following steps.

The ambiguity is sorted based on a floating solution variance, and the ambiguity is gradually searched for fixedly according to an accuracy order of the floating solution. Correlation between the parameter of the double difference ambiguity and a corresponding variance-covariance matrix is reduced to obtain a transformed ambiguity having lower correlation, where the equation for reducing correlation is as follows:

$$\begin{cases} \hat{z} = Z^T\overline{N} \\ Q_{\hat{z}} = Z^TQ_{\overline{N}}Z \end{cases} \quad (19)$$

where $Z^T$ represents a transformation matrix, $\overline{N}$ represents a floating solution of the ambiguity, $\hat{z}$ represents a transformed ambiguity, $Q_{\hat{a}}$ represents a variance-covariance matrix of the floating solution of the ambiguity, $Q_{\hat{z}}$ represents a variance-covariance matrix of a floating solution of the transformed ambiguity.

Elements in the matrix are all integers, values of determinants are equal to ±1, and a transformed search space is:

$$\psi_N = \{N \in Z^n \mid \|\overline{N} - N\|_{Q_{\overline{N}}}^2 \leq \chi^2\} \quad (20)$$

where $\chi^2$ represents a searching space.

An integer solution of an original ambiguity is obtained by performing an inverse transformation on a searched integer solution $\check{z}$:

$$\check{N} = Z^{-T}\check{z} \quad (21)$$

A Ratio value is defined to test the fixed solution of the ambiguity:

$$\text{Ratio} = \frac{\|\bar{N} - \bar{N}_S\|^2_{Q_{\hat{N}}}}{\|\bar{N} - \bar{N}_F\|^2_{Q_{\hat{a}}}} > 3.0 \qquad (22)$$

where $\bar{N}_S$ represents a suboptimal solution, and $\bar{N}_F$ represents an optimal solution.

If the above equation is satisfied, it is determined that the calculation is correct. If the above equation is not satisfied, it is determined that the calculation fails, the floating solution is retained, and positioning information is outputted based on the floating solution.

The optimization process includes: retaining the fixed solution of the ambiguity and configuring a fixed solution accuracy if multiple consecutive ambiguities are all fixed and satisfy a fixed condition in which a first ambiguity is fixed; and testing a part of ambiguities, and configuring the part of ambiguities as fixed solutions of the ambiguities if the fixed condition is satisfied. Using the optimization process, an ambiguity fixing rate is improved by gradually fixing and retaining a part of ambiguities, thereby further improving the stability and reliability of the positioning by the system in shaded and semi-shielded areas.

Finally, a fixed solution of a position parameter is calculated, and positioning information is outputted based on the fixed solution of the ambiguity and the fixed solution of the position parameter. The fixed solution of the position parameter is calculated as follows:

$$\bar{X} = \hat{X} - Q_{\hat{X}\hat{N}} Q_{\hat{N}\hat{N}}^{-1}(\hat{N} - \bar{N}) \qquad (23)$$

where $\hat{X}$ represents a floating solution of a position parameter, $\bar{X}$ represents a fixed solution of the position parameter, $\hat{N}$ represents a floating solution of an ambiguity, $\bar{N}$ represents a fixed solution of the ambiguity, $Q_{\hat{X}\hat{N}}$ represents a covariance matrix of the position parameter and the ambiguity parameter, and $Q_{\hat{N}\hat{N}}$ represents an ambiguity parameter variance-covariance matrix.

In the embodiment, data preprocessing and quality control are performed on the raw observation value. A satellite involved in the calculation is selected based on a signal-to-noise ratio of the raw data, a satellite height angle, and continuous tracking information, the pseudorange gross error is detected and repaired to ensure the quality of the pseudorange data, and cycle slip detection and elimination are performed on a carrier observation value, thereby providing data quality guarantee for high-precision relative positioning.

The quality of the pseudorange data is evaluated in real time based on results calculated by SPP and RTD. A random model of a double difference pseudorange observation equation used in RTD is determined based on a pseudorange remaining error calculated by SPP and a posterior remaining error of a previous epoch. A pseudorange remaining error is derived from the double difference pseudorange remaining error calculated by RTD, thereby providing a reference for the calculation of a floating solution.

Real-time estimation is performed by Kalman filtering by using a single difference ambiguity between stations as a parameter. The accuracy of the floating solution is improved by updating a double difference measurement observation value in real time in Kalman filtering. The real-time estimation is performed by using the single difference ambiguity as a parameter, ambiguity fixed errors can be effectively prevented, and complex data processing caused by changes in reference satellites can be avoided, thereby improving calculation efficiency.

The floating solution is determined by using Kalman filtering and a least square algorithm. Due to the poor accuracy of the raw pseudorange observation value, in order to reduce the convergence time, prevent filtering divergence, and improve the accuracy of the floating solution, the floating solution by the Kalman filtering is reasonably controlled, and the floating solution is determined by the Kalman filtering and the least square algorithm.

The floating solution is converted into a fixed solution. In a case that the accuracy of the floating solution is high, the success rate of converting the floating solution into a fixed solution is high. Firstly, the ambiguity of satellite observation values having a high accuracy floating solution is determined, and the ambiguity is set as a fixed value. Then, accuracies of floating solutions of remaining ambiguities are improved by performing the Kalman filtering later, and then the remaining ambiguities are gradually determined.

Those skilled in the art may make various modifications or additions or substitutions to the specific embodiments described, without departing from the spirit of the present disclosure or going beyond the scope defined by the appended claims.

The invention claimed is:

1. A GNSS-RTK-based positioning method, comprising:
   step 1, performing data quality control based on an analyzed raw satellite-ground observation value;
   step 2, performing pseudorange single-point positioning SPP by using a pseudorange observation value, and performing real-time pseudorange relative positioning RTD positioning based on a RTD pseudorange remaining error with respect to a real-time pseudorange of a previous epoch and a pseudorange remaining error of a current epoch calculated by using the SPP positioning;
   step 3, calculating, by using a RTD positioning result as an initial value, a float solution by respectively performing a least square algorithm and a Kalman filtering having an additional parameter of an ambiguity; and
   step 4, converting the floating solution of the ambiguity into a fixed solution by using an optimized partial ambiguity fixation strategy.

2. The GNSS-RTK-based positioning method according to claim 1, wherein the performing data quality control based on an analyzed raw satellite-ground observation value in step 1 comprises:
   obtaining a reliable observation value by performing observation data preprocessing;
   detecting and correcting a gross error by using a data detection method; and
   detecting and eliminating a cycle slip by using a cycle slip detection method based on a secondary difference between epochs and a single station cycle slip detection method based on a difference between epochs.

3. The GNSS-RTK-based positioning method according to claim 2, wherein the obtaining a reliable observation value by performing observation data preprocessing comprises:
   selecting an observation value having a signal-to-noise ratio within a predetermined range;
   determining data availability based on a pseudorange, carrier accuracy information, and an available identifier; and
   selecting observation data based on satellite continuous tracking and solution availability.

4. The GNSS-RTK-based positioning method according to claim 2, wherein the detecting and correcting a gross error by using a data detection method comprises:

constructing a linearized pseudorange observation equation:

$$V = L - A \cdot X$$

where V represents a remaining error vector, L represents an observation value minus a calculated value, A represents a design matrix, and X represents a parameter vector;

constructing a normalized remaining error $\overline{V}_i$ as a gross error detection:

$$\overline{V}_i = \frac{V_i}{\delta \sqrt{Q_{V_i V_i}}}, \quad \overline{V}_i \sim N(0,1)$$

$$Q_{VV} P^{-1} - A(A^T P A)^{-1} A^T$$

where $V_i$ represents an element of the remaining error vector, P represents a weight matrix of the observation value, $\delta$ represents a unit weight error, and $Q_{V_i V_i}$ represents a diagonal element in a remaining error co-factor matrix $Q_{VV}$;

if the normalized remaining error satisfies: $|\overline{V}_i| > 1.96$, determining that there is a gross error, and if the normalized remaining error satisfies: $|\overline{V}_i| \leq 1.96$, processing the weight matrix as follows:

$$\begin{cases} P = 2P, & 0 \leq |\overline{V}_i| < 0.5 \\ P = P, & 0.5 \leq |\overline{V}_i| < 1.0 \\ P = 0.5P, & 1.0 \leq |\overline{V}_i| < 1.5 \\ P = 0.25P, & 1.5 \leq |\overline{V}_i| \leq 1.96 \end{cases};$$

dividing the observation value minus a calculated value L into $l_1$ and $l_2$, where $l_1$ contains no gross error, $l_2$ contains a gross error vector S, and dimensions of $l_1$ and $l_2$ are $n_1$ and $n_2$ respectively;

transforming the pseudorange observation equation into:

$$\begin{bmatrix} V_1 \\ V_2 \end{bmatrix} = \begin{bmatrix} l_1 \\ l_2 \end{bmatrix} - \begin{bmatrix} A_1 \\ A_2 \end{bmatrix} \cdot X - \begin{bmatrix} 0 \\ S \end{bmatrix};$$

supposing $H = [0 \ E]^T$, where E is an $n_2 \times n_2$ identity matrix, and calculating and correcting a gross error vector S as follows:

$$S = P_{SS}^{-1} H^T P V$$

$$P_{SS} = H^T P Q_{VV} P H.$$

5. The GNSS-RTK-based positioning method according to claim 2, wherein the detecting and eliminating a cycle slip by using a cycle slip detection method based on a secondary difference between epochs and a single station cycle slip detection method based on a difference between epochs comprises:

detecting a large cycle slip equal to or greater than two cycles based on the second difference between epochs, and detecting and eliminating a small cycle slip by using the single station cycle slip detection method based on a single difference observation value between epochs, wherein the detecting a large cycle slip equal to or greater than two cycles based on the second difference between epochs comprises:

calculating, based on a carrier observation value $\varphi_t$ of the satellite at the current epoch and a carrier observation value $\varphi_{t-1}$ at the previous epoch, a carrier observation value single difference between epochs for the current epoch:

$$\nabla \varphi_t = (\varphi_t - \varphi_{t-1}) \tag{9}$$

calculating a carrier observation value single difference between epochs for the previous epoch:

$$\nabla \varphi_{t-1} = \varphi_{t-1} - \varphi_{t-2} \tag{10}$$

calculating a carrier observation value secondary difference between epochs for the current epoch:

$$\nabla \Delta \varphi = \nabla \varphi_t - \nabla \varphi_{t-1} \tag{11}$$

calculating carrier observation value secondary differences between epochs for all observation satellites $F = [\nabla \Delta \varphi^1, \nabla \Delta \varphi^2, \ldots, \nabla \Delta \varphi^n]$ if the carrier is continuously tracked, wherein elements in the vector F are concentratedly distributed, and if an element goes beyond a value center by 2 cycles, a large cycle slip is determined.

6. The GNSS-RTK-based positioning method according to claim 1, wherein the RTD positioning in step 2 comprises:

calculating an observation value variance $\sigma_i^2$ of the current epoch based on a RTD pseudorange remaining error of the previous epoch and the pseudorange remaining error calculated by using the SPP positioning at the current epoch, wherein the observation value variance $\sigma_i^2$ of the current epoch is calculated by using following models:

$$\begin{cases} \sigma_i^2 = 0.3 V_0^2 + 0.7(V_b^2 + V_r^2), & V_0^2 > 4(V_b^2 + V_r^2) \\ \sigma_i^2 = 0.5 V_0^2 + 0.5(V_b^2 + V_r^2), & (V_b^2 + V_r^2) < V_0^2 < 4(V_b^2 + V_r^2) \\ \sigma_i^2 = 0.7 V_0^2 + 0.3(V_b^2 + V_r^2), & V_0^2 \leq (V_b^2 + V_r^2) \end{cases}$$

where $V_b$ represents a pseudorange remaining error by SPP positioning at a reference station, $V_r$ represents a pseudorange remaining error by SPP positioning at a rover station, and $V_0$ represents a pseudorange remaining error of the previous epoch by RTD positioning.

7. The GNSS-RTK-based positioning method according to claim 1, wherein the calculating, by using a RTD positioning result as an initial value, a float solution by respectively performing a least square algorithm and a Kalman filtering having an additional parameter of an ambiguity in step 3 comprises:

constructing double difference observation equations:

$$\begin{cases} \Delta \nabla P_i = \Delta \nabla \rho + \Delta \nabla T + \Delta \nabla I + \varepsilon_{\Delta \nabla P} \\ \Delta \nabla \phi_i = \Delta \nabla \rho + \Delta \nabla T - \Delta \nabla I + \lambda_i \Delta \nabla N_i + \varepsilon_{\Delta \nabla \phi} \end{cases}$$

where $\Delta \nabla$ represents a double difference operator, $P_i$ represents a pseudorange observation value, $\rho$ represents a satellite-ground distance, T represents a tropospheric delay, I represents an ionospheric delay, $\varepsilon_{\Delta \nabla P}$ represents a double difference pseudorange observation noise, $\phi_i$ represents a carrier observation value, $\lambda_i$ represents a carrier wavelength, $\Delta\nabla N_i$ represents a double difference ambiguity, and $\varepsilon_{\Delta\nabla\phi}$ represents a double difference carrier observation noise;

converting, based on the double difference observation equations by using position, velocity, and acceleration of the rover station, and single difference ambiguity between stations as to-be-estimated parameters, the single difference ambiguity between stations into the double difference ambiguity $\Delta\nabla N_i$ by using a transformation matrix, wherein a parameter matrix of the Kalman filtering and the transformation matrix are as follows:

$$X_k = [xyzv_xv_yv_za_xa_ya_z\Delta N^1 \ldots \Delta N^n]^T$$

$$H_k = \begin{bmatrix} l^1 & m^1 & n^1 & 0 & \lambda_1^1 & \ldots & -\lambda_1^j & \ldots & \ldots \\ \vdots & \vdots & \vdots & 0 & \vdots & & \vdots & & \vdots \\ l^n & m^n & n^n & 0 & \ldots & \ldots & -\lambda_1^j & \ldots & \lambda_1^n \\ l^n & m^n & n^n & 0 & \ldots & \ldots & 0 & \ldots & 0 \\ \vdots & \vdots & \vdots & \vdots & \vdots & & \vdots & & \vdots \\ l^n & m^n & n^n & 0 & \ldots & \ldots & 0 & \ldots & 0 \end{bmatrix}^T$$

where (x, y, z) represents a position of the satellite at a reference time instant, $(v_x, v_y, v_y)$ represents a velocity of the satellite at the reference time instant, $(a_x, a_y, a_z)$ represents an acceleration of the satellite at the reference time instant;

calculating a floating solution $\hat{N}$ of the ambiguity and a posterior remaining error ci by performing a least square algorithm, and transforming, based on the floating solution $\hat{N}$ of the ambiguity and the posterior remaining error $\sigma$, the floating solution $\overline{N}$ of the ambiguity calculated by the Kalman filtering as follows:

$$\begin{cases} \overline{N} = \overline{N}, & 0 \le |\overline{N} - \hat{N}| < 1.5\sigma \\ \overline{N} = 0.35\overline{N} + 0.65\hat{N}, & 1.5\sigma \le |\overline{N} - \hat{N}| < 3.0\sigma \\ \overline{N} = \hat{N}, & |\overline{N} - \hat{N}| \ge 3.0\sigma \end{cases}$$

8. The GNSS-RTK-based positioning method according to claim 1, wherein the converting the floating solution of the ambiguity into a fixed solution by using an optimized partial ambiguity fixation strategy in step 4 comprises:

sorting the ambiguity based on a floating solution variance, and gradually searching for the ambiguity fixedly according to an accuracy order of the floating solution;

reducing correlation between the parameter of double difference ambiguity and a corresponding variance-covariance matrix to obtain a transformed ambiguity having lower correlation, wherein the equation for reducing correlation is as follows:

$$\begin{cases} \hat{z} = Z^T\overline{N} \\ Q_{\hat{z}} = Z^T Q_{\overline{N}} Z \end{cases}$$

where $Z^T$ represents a transformation matrix, $\overline{N}$ represents a floating solution of the ambiguity, $\hat{z}$ represents a transformed ambiguity, $Q_{\hat{a}}$ represents a variance-covariance matrix of the floating solution of the ambiguity, $Q_{\hat{z}}$ represents a variance-covariance matrix of a floating solution of the transformed ambiguity, elements in the matrix are all integers, values of determinants are equal to ±1, and a transformed search space is:

$$\psi_N = \{N \in Z^n | \|\overline{N} - N\|_{Q_{\overline{N}}}^2 \le \chi^2\}$$

where $\chi^2$ represents a searching space;

obtaining an integer solution of an original ambiguity by performing an inverse transformation on a searched integer solution $\check{z}$:

$$\check{N} = Z^{-T}\check{z};$$

defining a Ratio value to test the fixed solution of the ambiguity:

$$\text{Ratio} = \frac{\|\overline{N} - \overline{N}_S\|_{Q_{\hat{N}}}^2}{\|\overline{N} - \overline{N}_F\|_{Q_{\hat{a}}}^2} > 3.0$$

where $\overline{N}_S$ represents a suboptimal solution, and $\overline{N}_F$ represents an optimal solution;

determining that the solution is qualified if the above equation is satisfied, and retaining the floating solution if the above equation is not satisfied;

retaining the fixed solution of the ambiguity and configuring a fixed solution accuracy if a plurality of consecutive ambiguities are all fixed and satisfy a fixed condition in which a first ambiguity is fixed; and testing a part of ambiguities, and configuring the part of ambiguities as fixed solutions if the fixed condition is satisfied.

\* \* \* \* \*